(12) United States Patent
Allison et al.

(10) Patent No.: US 8,645,264 B2
(45) Date of Patent: Feb. 4, 2014

(54) APPARATUS AND METHODS FOR VERIFYING A CREDIT APPLICANT'S INCOME THAT ENHANCE A CREDIT APPLICANT'S EXPERIENCE

(75) Inventors: Thayer Allison, Charlotte, NC (US); Robert Caruso, Charlotte, NC (US); Sudeshna Banerjee, Charlotte, NC (US); Debashis Ghosh, Charlotte, NC (US); Kurt Newman, Charlotte, NC (US); David Joa, Charlotte, NC (US); Arun Pinto, Charlotte, NC (US); Yanghong Shao, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 1086 days.

(21) Appl. No.: 12/256,639

(22) Filed: Oct. 23, 2008
(Under 37 CFR 1.47)

(65) Prior Publication Data
US 2010/0106638 A1   Apr. 29, 2010

(51) Int. Cl.
*G06Q 40/00* (2012.01)
*G06Q 40/02* (2012.01)

(52) U.S. Cl.
CPC .................................. *G06Q 40/025* (2013.01)
USPC ............................................................ 705/38

(58) Field of Classification Search
None
See application file for complete search history.

(56) References Cited

U.S. PATENT DOCUMENTS

| | | | |
|---|---|---|---|
| 2005/0197953 A1* | 9/2005 | Broadbent et al. | 705/38 |
| 2007/0067235 A1* | 3/2007 | Nathans et al. | 705/38 |
| 2007/0156552 A1* | 7/2007 | Manganiello | 705/35 |

OTHER PUBLICATIONS http://www.talx.com/Solutions/Compliance/Verifications retrieved on May 20, 2009.
http://www.1sourcedata.com/1sourcedata_overview.html retrieved on May 20, 2009.
http://www.idcheckdirect.com retrieved on May 20, 2009.

* cited by examiner

*Primary Examiner* — Kambiz Abdi
*Assistant Examiner* — Stephanie M Ziegle
(74) *Attorney, Agent, or Firm* — Weiss & Arons LLP; Michael Springs

(57) ABSTRACT

Apparatus and methods for processing a loan application. The apparatus and methods may involve accessing a financial institution customer account that includes a plurality of transactions; identifying those transactions that belong to a predetermined transaction category; and summarizing the transactions. Summary information may be presented as part of an income and expenses flow report that at least partially characterizes the account or the applicant. A financial institution representative may query a database for the summary information and, optionally, initiate an underwriting process based on the loan application and the summary information.

21 Claims, 14 Drawing Sheets

| Household = 5 Income Type | Jul 2006 | Aug 2006 | Sep 2006 | Oct 2006 | Nov 2006 | Dec 2006 | Jan 2006 | Feb 2006 | Estimated Annual Net Inc | Estimated Annual Gross Inc | Estimated Withholding Rate |
|---|---|---|---|---|---|---|---|---|---|---|---|
| | | | | | Actual Income | | | | | | |
| Business Income | $280,416 | $304,898 | $265,259 | $330,401 | $246,721 | $267,139 | $329,434 | $252,473 | $3,415,112 | $5,598,544 | 39% |
| Other | — | — | — | — | $10,452 | $27,635 | $18,879 | $17,945 | $112,367 | $112,367 | — |
| Total | $280,416 | $304,898 | $265,259 | $330,401 | $257,173 | $294,774 | $348,313 | $270,418 | $3,527,478 | $5,710,911 | — |

Total Monthly Income Amount from Application  $3,600
Implied Annual Income Amount  $43,200
Est. Ann. Gross Inc. Minus Implied Ann. Income  $5,667,711

| Household = 6 Income Type | Jul 2006 | Aug 2006 | Sep 2006 | Oct 2006 | Nov 2006 | Dec 2006 | Jan 2006 | Feb 2006 | Estimated Annual Net Inc | Estimated Annual Gross Inc | Estimated Withholding Rate |
|---|---|---|---|---|---|---|---|---|---|---|---|
| | | | | | Actual Income | | | | | | |
| Other | $400 | $400 | $400 | $400 | $400 | $600 | $1,785 | $1,931 | $9,474 | $9,474 | — |
| Regular Pay | $8,701 | $8,701 | $8,701 | $8,701 | $8,701 | $8,701 | $8,919 | $8,922 | $105,071 | $175,118 | 40% |
| Pension | — | $337 | $674 | — | $337 | $685 | — | $348 | $3,572 | $3,572 | — |
| Total | $9,101 | $9,438 | $9,775 | $9,101 | $9,438 | $9,986 | $10,704 | $11,201 | $118,116 | $188,164 | — |

Total Monthly Income Amount from Application  $8,138
Implied Annual Income Amount  $97,656
Est. Ann. Gross Inc. Minus Implied Ann. Income  $90,508

FIG. 8A

| House-hold =7 Income Type | Actual Income | | | | | | | | Estimated Annual Net Inc | Estimated Annual Gross Inc | Estimated Withhold-ing Rate |
|---|---|---|---|---|---|---|---|---|---|---|---|
| | Jul 2006 | Aug 2006 | Sep 2006 | Oct 2006 | Nov 2006 | Dec 2006 | Jan 2006 | Feb 2006 | | | |
| Regular Pay | $2,321 | $2,321 | $2,321 | $2,321 | $2,321 | $2,321 | $2,397 | $2,397 | $28,080 | $35,100 | 20% |
| Pension | – | $2,472 | $4,944 | – | $2,472 | $5,026 | – | $2,554 | $26,202 | $26,202 | – |
| Social Security | $1,110 | $1,110 | $1,110 | $1,110 | $1,110 | $1,110 | $1,145 | $1,145 | $13,425 | $13,425 | – |
| Total | $3,431 | $5,903 | $8,375 | $3,431 | $5,903 | $8,457 | $3,542 | $6,096 | $67,707 | $74,727 | – |

Total Monthly Income Amount from Application $5,902
Implied Annual Income Amount $70,824
Est. Ann. Gross Inc. Minus Implied Ann. Income $3,903

FIG. 8B

808 — Household =8

| Household Income Type | Actual Income | | | | | | | | Estimated Annual Net Inc | Estimated Annual Gross Inc | Estimated Withholding Rate |
|---|---|---|---|---|---|---|---|---|---|---|---|
| | Jul 2006 | Aug 2006 | Sep 2006 | Oct 2006 | Nov 2006 | Dec 2006 | Jan 2006 | Feb 2006 | | | |
| Regular Pay | — | — | — | — | — | — | — | $18,000 | $27,000 | $33,750 | 20% |
| Social Security | $1,044 | $1,044 | $1,044 | $1,044 | $1,044 | $1,044 | $1,076 | $1,076 | $12,624 | $12,624 | — |
| Total | $1,044 | $1,044 | $1,044 | $1,044 | $1,044 | $1,044 | $1,076 | $19,076 | $39,624 | $46,374 | — |

830
Total Monthly Income Amount from Application  $1,431
Implied Annual Income Amount  $17,172
Est. Ann. Gross Inc. Minus Implied Ann. Income  $29,202

810 — Household =9

| Household Income Type | Actual Income | | | | | | | | Estimated Annual Net Inc | Estimated Annual Gross Inc | Estimated Withholding Rate |
|---|---|---|---|---|---|---|---|---|---|---|---|
| | Jul 2006 | Aug 2006 | Sep 2006 | Oct 2006 | Nov 2006 | Dec 2006 | Jan 2006 | Feb 2006 | | | |
| Regular Pay | $1,380 | $1,380 | $1,380 | $1,380 | $1,380 | $1,380 | $1,380 | $1,380 | $16,560 | $19,482 | 15% |

830
Total Monthly Income Amount from Application  $7,985
Implied Annual Income Amount  $95,820
Est. Ann. Gross Inc. Minus Implied Ann. Income  ($76,338)

FIG. 9A

| Household =10 Income Type | Actual Income | | | | | | | | Estimated Annual Net Inc | Estimated Annual Gross Inc | Estimated Withholding Rate |
| --- | --- | --- | --- | --- | --- | --- | --- | --- | --- | --- | --- |
| | Jul 2006 | Aug 2006 | Sep 2006 | Oct 2006 | Nov 2006 | Dec 2006 | Jan 2006 | Feb 2006 | | | |
| Other | — | — | — | — | — | — | — | $52,036 | $78,054 | $78,054 | — |
| Pension | $2,502 | $2,502 | $2,502 | $2,502 | $2,502 | $2,502 | $2,549 | $2,549 | $30,165 | $30,165 | — |
| Social Security | $1,185 | $1,185 | $1,185 | $1,185 | $1,185 | $1,185 | $1,222 | $1,222 | $14,331 | $14,331 | — |
| Total | $3,687 | $3,687 | $3,687 | $3,687 | $3,687 | $3,687 | $3,771 | $55,807 | $122,550 | $122,550 | — |

Total Monthly Income Amount from Application $5,539
Implied Annual Income Amount $66,468
Est. Ann. Gross Inc. Minus Implied Ann. Income $56,082

ID#3 John Smith — 1004  
Customer — 1006  
Report Date:mm-dd-yyyy — 1002
1008

| Flow | Type of Income | Business Entity | Jun-06 | Jul-06 | Aug-06 | Sep-06 | Oct-06 | Nov-06 | Dec-06 |
|---|---|---|---|---|---|---|---|---|---|
| In | PAY-Employment Pay | TLD ENGINEERING | $4,836 | $3,060 | $3,604 | $3,533 | $2,684 | $3,079 | $4,551 |
| In | RMB-Employee Reimb | BILDEN WHITE & | $137 | $360 | $1,281 | — | $716 | — | $47 |
| Out | CRD-Payment to Credit Card | MULTICARD PAYMT | — | — | — | ($30) | ($111) | ($31) | — |
| Out | CRD-Payment to Credit Card | ADVENTURE ARC | — | ($25) | ($25) | ($40) | ($44) | — | — |
| Out | CRD-Payment to Credit Card | KCDEPTSTORE MC | — | — | — | — | — | — | ($485) |

1010

| Jan-07 | Feb-07 | Mar-07 | Apr-07 | May-07 | Jun-07 | Total |
|---|---|---|---|---|---|---|
| $3,117 | $3,247 | $3,285 | $2,754 | $3,013 | $4,254 | $45,017 |
| — | $8 | — | — | — | $382 | $2,923 |
| — | — | ($28) | — | — | — | ($208) |
| — | — | ($3) | ($3) | ($3) | ($3) | ($146) |
| — | — | — | — | — | — | ($485) |

| ID#4 1004 | Mary Doe Customer | 1006 Report Date:mm-dd-yyyy 1008 | | | | | | | 1010 | | | |
|---|---|---|---|---|---|---|---|---|---|---|---|---|
| Flow | Type of Income | Business Entity | Jun-06 | Jul-06 | Aug-06 | Sep-06 | Oct-06 | Nov-06 | Dec-06 | | | |
| In | DIV- Dividend/ Interest | BK OF REPUBLIC | — | — | — | — | — | — | — | | | |
| In | PEN-Pension | LRV STEEL (REPUB | $1,374 | — | $687 | $1,374 | — | $687 | $687 | | | |
| In | SSI-Social Security | US TREASURY FINANCIAL MGT SVC | $1,534 | $1,534 | $1,534 | $1,534 | $1,534 | $1,534 | $1,534 | | | |

| | | | 1010 | | | | | | 1012 |
|---|---|---|---|---|---|---|---|---|---|
| Jan-07 | Feb-07 | Mar-07 | Apr-07 | May-07 | Jun-07 | | | | Total |
| $624 | — | $688 | — | — | — | | | | $1,312 |
| $687 | $687 | $1,374 | — | $687 | $1,374 | | | | $9,618 |
| $1,581 | $1,581 | $1,581 | $1,581 | $1,581 | $1,581 | | | | $20,224 |

1004  1006
ID#5 / JW Brown    Report Date:mm-dd-yyyy — 1002
      Customer                     1008

| Flow | Type of Income | Business Entity | Jun-06 | Jul-06 | Aug-06 | Sep-06 | Oct-06 | Nov-06 | Dec-06 |
|---|---|---|---|---|---|---|---|---|---|
| Out | CRD-Payment to Credit Card | INVESTMENT ONE | ($310) | ($70) | — | — | — | — | — |
| Out | CRD-Payment to Credit Card | INVESTMENT ONE CREDIT CAR | ($25) | ($80) | — | — | — | — | — |
| Out | CRD-Payment to Credit Card | ABC CREDIT CARD | — | — | ($40) | ($400) | ($150) | ($55) | — |
| Out | MTG-Mortgage | NEBRASKA MUTUAL MORTGAGE | — | — | — | — | ($350) | — | — |

1010

| Jan-07 | Feb-07 | Mar-07 | Apr-07 | May-07 | Jun-07 | Total |
|---|---|---|---|---|---|---|
| — | — | — | — | — | — | ($29) |
| — | — | — | — | — | — | ($380) |
| — | — | — | — | — | — | ($750) |
| — | — | — | — | — | — | ($350) |

APPARATUS AND METHODS FOR VERIFYING A CREDIT APPLICANT'S INCOME THAT ENHANCE A CREDIT APPLICANT'S EXPERIENCE

FIELD OF TECHNOLOGY

Aspects of the disclosure relate to the improvement of services for prospective borrowers. In particular, the disclosure relates to the use of banking data to assess lending risk and the improvement of service for the borrowers based on the assessment of risk.

BACKGROUND

A mortgage or loan applicant typically is required to provide to a prospective lender documentation showing the applicant's sources of funds and amount of income. The lender requires the documentation so that the lender can evaluate the risk that the applicant will not pay back the loan. The lender usually requires evidence showing that the applicant has sufficient income and evidence showing the degree to which the applicant is already in debt.

The applicant's income and debt information may be verified using third party information. If there are deficiencies in the applicant's information, the deficiencies may be made up by the third party information.

There are several methods for obtaining the third party information. The different methods provide different types of information. For example, credit bureaus provide information on the applicant's historical credit payments, but do not provide any information about income. Other services provide information regarding the applicant's income, but do not provide any information about credit history. Such services include those available under the trademarks TALX® and 1SourceData® and ID Check Direct.

There are ways to statistically estimate the applicant's annual gross income from credit bureau data and loan application data. These estimates are subject to various errors that could reduce the accuracy of risk evaluation based upon such estimates.

In some instances, the lender may require the applicant to state his income and major recurring expenses and then support his statements with documentation such as pay-stubs, W-2 forms, loan documents and credit card statements.

Providing or procuring documentation to support a credit application can be costly, require effort and can extend the lending process. For example, when the applicant provides documentation to support the applicant's application, the applicant typically must search his files for one or more W-2 forms, pay stubs, credit documents and invoices. When supporting information is ordered by the lender, the lender typically must request the information from one or more vendors and pay one or more services fee.

It would be desirable, therefore, to provide apparatus and methods for reducing the cost, effort and/or time involved in gathering information to support a loan application.

SUMMARY OF THE INVENTION

It is an object of this invention to provide apparatus and methods for reducing the cost, effort and/or time involved in gathering information to support a loan application. Apparatus and methods for processing a loan application are therefore provided.

The apparatus and methods may involve receiving a loan application from a customer, querying a database for information regarding the customer's banking transactions, and, optionally, initiating an underwriting process based on the loan application and the customer's banking transactions. The apparatus and methods may involve accessing a customer account that includes a plurality of transactions; identifying the transactions that belong to a predetermined transaction category; and summarizing the transactions that belong to the category.

The apparatus and methods may involve a database engine, a processing module and an output device. The database engine may be configured to provide to the processing module a transaction record from a customer account. The processing module may be configured to categorize the record. The output device may be configured to output information that identifies the category and other information that is based on the transaction record. The information may be presented as part of an income and expenses flow report that at least partially characterizes the account and/or the applicant.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which:

FIG. 8A shows information in accordance with the principles of the invention;

FIG. 8B shows a continuation of the information of FIG. 8A;

FIG. 9A shows other information in accordance with the principles of the invention;

FIG. 9B shows a continuation of the information of FIG. 9A;

FIG. 10 shows yet other information in accordance with the principles of the invention;

FIG. 11 shows still other information in accordance with the principles of the invention; and FIG. 12 shows still information in accordance with the principles of the invention.

DETAILED DESCRIPTION OF EMBODIMENTS

Figure 1:
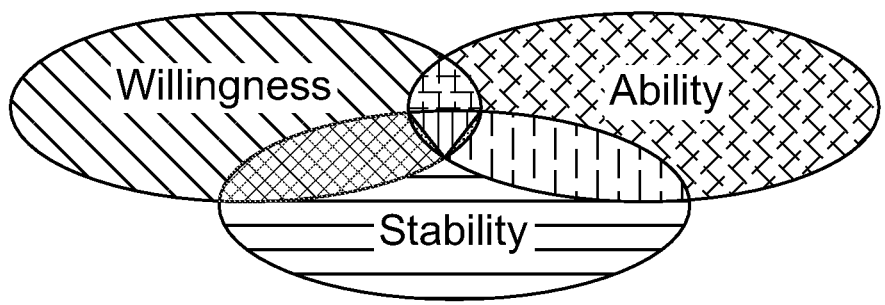
FIG. 1 shows information that may be used in accordance with the principles of the invention.

Many customers of financial institutions regularly provide their financial institution with information that may be useful to the financial institution for the evaluation of a loan application from the customer. The information may relate to the customer's income. The information may relate to the customer's credit-related spending and repayment history. For example, many customers have their paychecks deposited in the financial institution using a direct deposit service.

Even though the customer's account includes income- or expense-related information, a representative of the financial institution is likely to ask the customer for income- or expense-related information when the customer applies to the institution for a loan. The apparatus and methods of the invention may be used by the financial institution to access and analyze information that is associated with the customer's banking records. The information may be used to confirm income and credit amounts stated by the customer in a credit application.

In some embodiments, apparatus and methods in accordance with the principles of the invention may involve receiving a loan application from a customer, querying a database for transactional information corresponding to the customer, and optionally initiating an underwriting process based on the loan application.

In some embodiments, apparatus and methods in accordance with the principles of the invention may involve accessing a customer account, identifying in the account transactions that belong to a predetermined transaction category, and summarizing the transactions that belong to the category. The transactions may be summarized in a report. When the customer account is in the custody of a first financial institution, the apparatus and methods may involve providing the report to a representative of a second financial institution.

Apparatus in accordance with the principles of the invention may include a database engine, a processing module, and an output device. The database engine may be configured to provide to the processing module a transaction record from a customer account. The processing module may be configured to categorize the record. The output device may be configured to output, among other things: (1) first information identifying the category; and (2) second information based on the record.

The apparatus may include a storage module for storing the first information identifying the category and the second information based on the record to the storage module. The first information identifying the category and the second information based on the record may be included in an income and expenses flow report for the applicant that is stored in the storage module.

In some embodiments, the apparatus and methods may be configured as: (1) an income and expense history summarization component; and (2) an income and expense history lookup component. The income and expense history summarization component may include a data processing function. In that function, the transactions of some or all bank customers may be mined, categorized, and summarized to provide a report of the customers' income and major expenses over a selected time period. The time period may be, for example, the last n months.

The income and expense history lookup component may provide a resource that a bank representative may use to query the database for information regarding the applicant (who in some embodiments is one of the bank customers). The lookup function may provide a report on the applicant that can be used as evidence of income and expenses on the application.

In some embodiments of the invention, income and credit expense history data may be provided to a financial institution representative via existing or modified in-place software. Income and credit transactions would be captured and summarized by a computer program. The summarized information would be loaded into an application which is already in place and used by bank associates to service and make credit decisions for bank customers. This income and credit expense history information would improve their ability to make good loan and credit decisions.

The apparatus and methods may quickly and accurately confirm characteristics of an applicant's income. The income characteristics may include income sources, amounts, frequency and any other suitable income characteristics. The apparatus and methods of the invention may quickly and accurately confirm characteristics of the applicant's expenses. The expense characteristics may be related to mortgage, car payment, credit card, utilities and any other expenses. The expense characteristics may include payee identification, creditor identification, payment amounts and payment frequency.

Because the bank has confirmed the applicant's income statements, the applicant may not be required to produce documentation of the information.

The apparatus and methods may reduce the number of steps in the credit application process. The apparatus and methods may help change the current industry practice by using net income instead of gross income for underwriting the loan.

For applicants who have their paycheck, social security or pension income deposited in their checking accounts at the bank, the apparatus and methods may quickly provide accurate and reliable information. They may thus save money and time for the lender in processing the loan application. Because the apparatus and methods quickly may provide the financial institution with accurate and reliable information, the loan applicants' experiences with the application process may be enhanced.

The apparatus and methods may be useful to any financial institution, in particular a full-service financial institution. Using the apparatus and/or methods, the financial institution may become a source for income verification for other merchants and vendors who are considering extending credit to the financial institution's customers. The customer could refer the merchant or vendor to the financial institution. The financial institution could then provide income- or credit-related information to the merchant. The information may be a primary report. The information may be a confirmatory report.

The apparatus and methods may include a platform with which the financial institution may share with one or more other financial institutions customer income and credit expense data. The platform may provide the infrastructure for a consortium through which financial institutions may verify their applicants' income- and/or credit-related dated. Credit applicants may benefit by having lower interest rates if the applicant chooses to voluntarily submit verification information. Financial institutions may benefit from the additional data, which may help reduce lending risk.

FIGS. 1-4 illustrate some features of customer banking behavior that may be used to enhance a credit applicant's experience in accordance with the principles of the invention. FIG. 1 schematically shows factors that are believed to affect the creditworthiness of an applicant. The factors are: willingness to pay back a loan, ability to pay back the loan, and stability. Ability is correlated with annual income. Stability is correlated with regularity of income. The financial institution may have access to data related to annual income and regular income. The data may be used to characterize an applicant's ability and stability, respectively.

Figure 2:
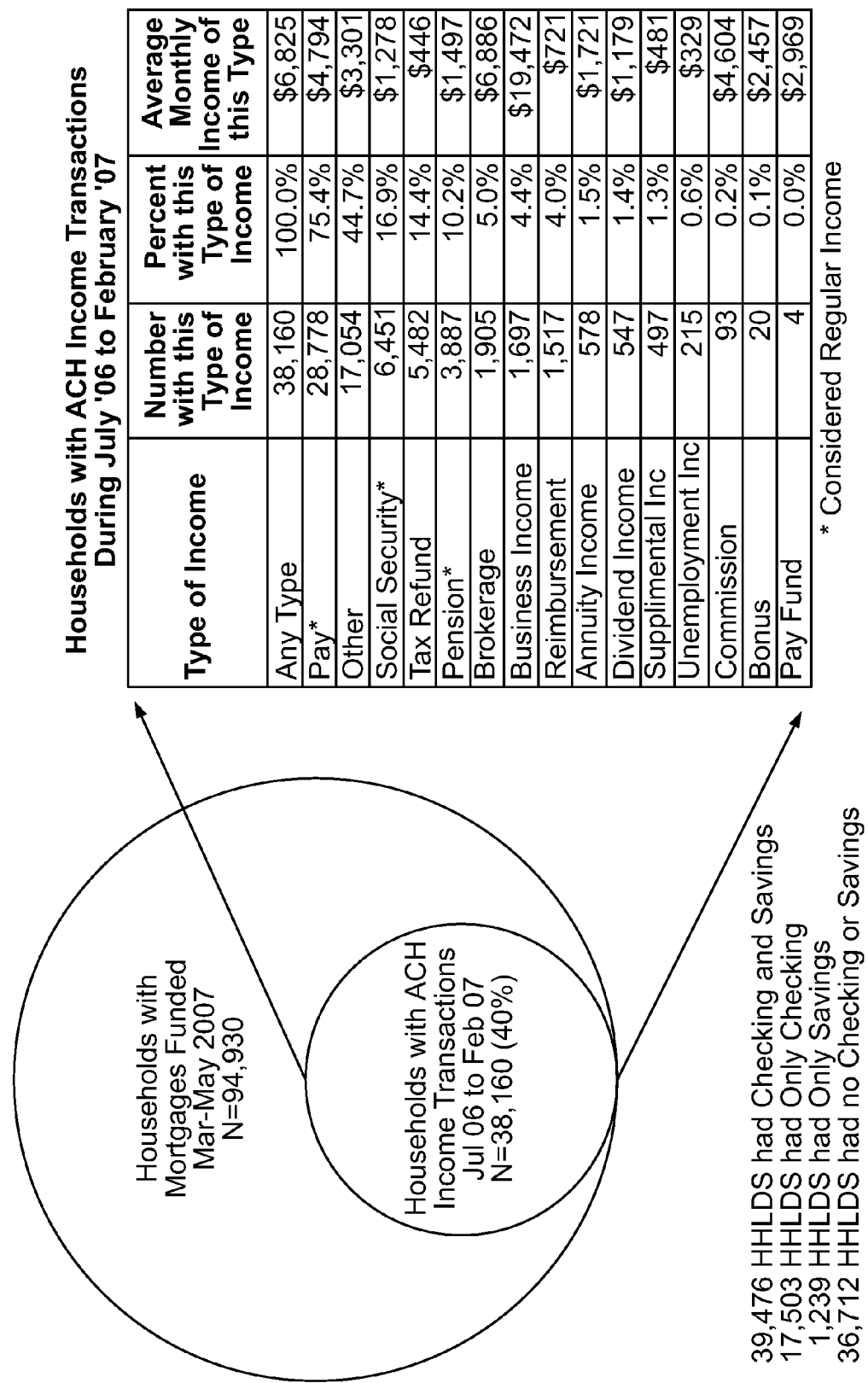
FIG. 2 shows other information that may be used in accordance with the principles of the invention.

FIG. 2 illustrates the extent to which historical loan recipients have banking data that may be used to enhance a credit applicant's experience in accordance with the principles of the invention. FIG. 2 shows summary results of a study population of 94,930 households that received mortgaged funds in the period March-May, 2007. Of those households, 38,160 engaged in income-related Automated Clearing House ("ACH") transactions during the period July, 2006 to February, 2007. The latter period corresponds to the eight-month period leading up to loan application approvals for the mortgaged funds. It is noted that a population of mortgage applicants will probably have a lower incidence of income transactions.

FIG. 2 shows that 75.4% of the households received pay income via ACH, 16.9% received social security income via ACH and 10.2% received pension income by ACH. These types of income may be viewed as regular income. FIG. 2 also shows that 100% of the households received at least some income via ACH.

Figure 3:
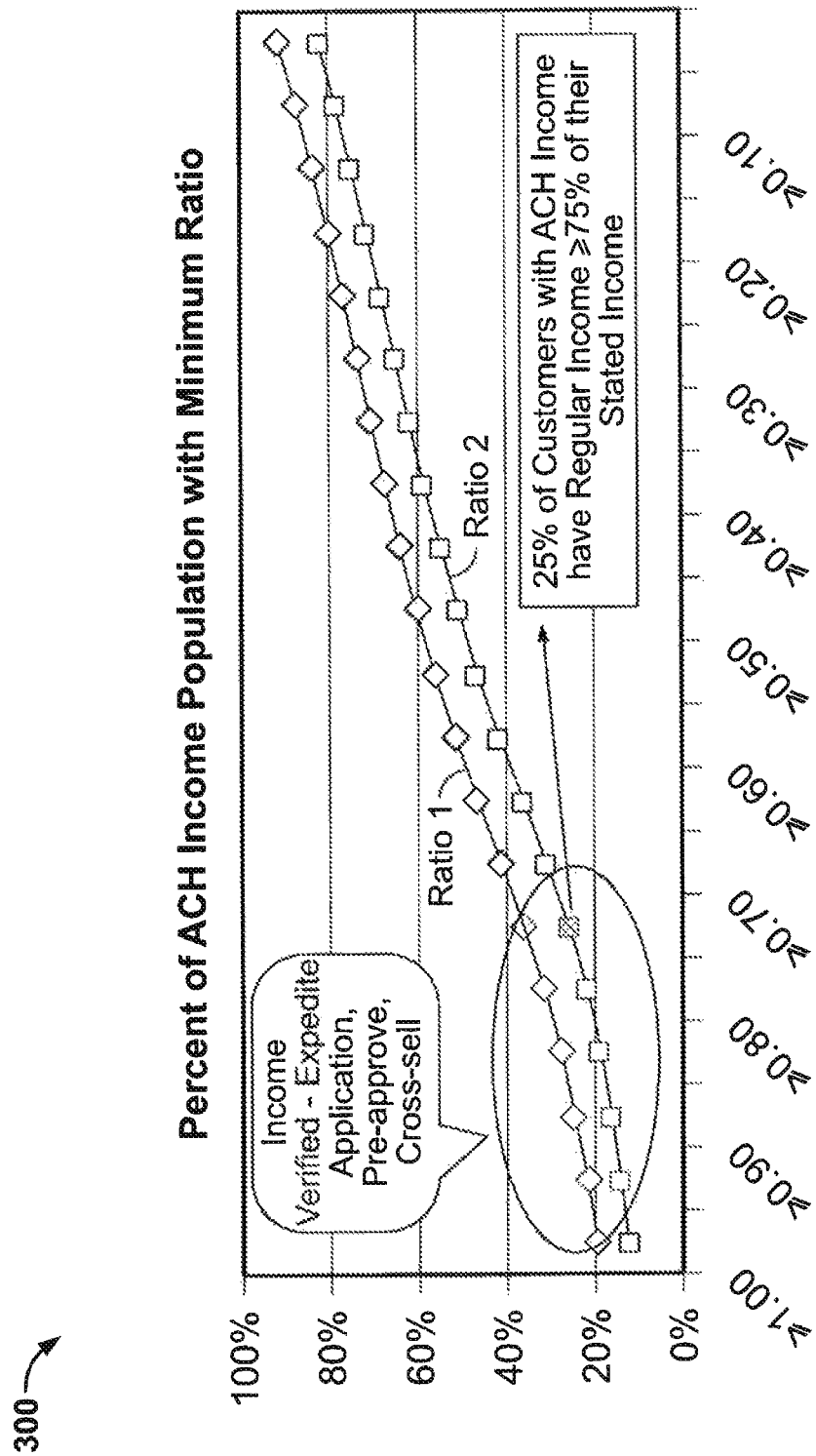
FIG. 3 shows still other information that may be used in accordance with the principles of the invention.

FIG. 3 shows data that relate historic banking data and historic actual income. Plot 300 in FIG. 3 shows a correspondence between applicants' ACH transaction data and income amounts stated on the same applicants' applications for mortgaged funds. The stated income amounts, in this context, are considered as actual income amounts. The stated income amounts thus may be used as benchmarks for the quality of the ACH-based income estimates. Many of the applicants' income histories based on ACH data corresponded well with the income that was stated on their application.

Ratio 1 (the "Total Income Ratio") in FIG. 3 is the ratio of Observed Total ACH Monthly Income to Stated Total Monthly Income. The Observed Total ACH Monthly Income was based on applicants' ACH transactions in the financial institution's customer accounts. The Stated Total Monthly Income is the income stated by the same applicants on the aforementioned loan applications. Ratio 2 (the "Regular Income Ratio") in FIG. 3 is the ratio of Observed Regular ACH Monthly Income to Stated Monthly Income. The Observed Regular ACH Monthly Income was based on applicants' ACH transactions in the financial institution's customer accounts. The Stated Monthly Income is the income stated by the same applicants on the aforementioned loan applications.

The horizontal axis in FIG. 3 includes a range of ratio values, ranging from 1.00, near the origin, to 0.00, at the right. The vertical axis includes % of all ACH customers in the study whose Ratio 1 or Ratio 2 values are at least a certain value (of the values shown on the horizontal axis). For example, 25% of ACH customers' Ratio 2 values are greater than or equal to about 0.75. This means that 25% of the ACH customers' ACH incomes are at least 75% of their stated incomes. ACH incomes are better estimates of stated incomes near the left end of plot 300.

The study showed, among other things, that applicants' banking data provides useful evidence of the applicants' income. This may reduce or eliminate the need for the engagement of income and credit data vendors. The banking data may provide more detail about an applicant's income than such a vendor might provide regarding month-to-month actual income and other sources of income that are made via ACH.

Customer account information such as that shown and described above often provides information about an applicant's net pay. Credit risk evaluation, however, is often based on a customer's gross income information. A second study showed that there is a strong correspondence between ACH-based net pay information and gross pay.

Figure 4:
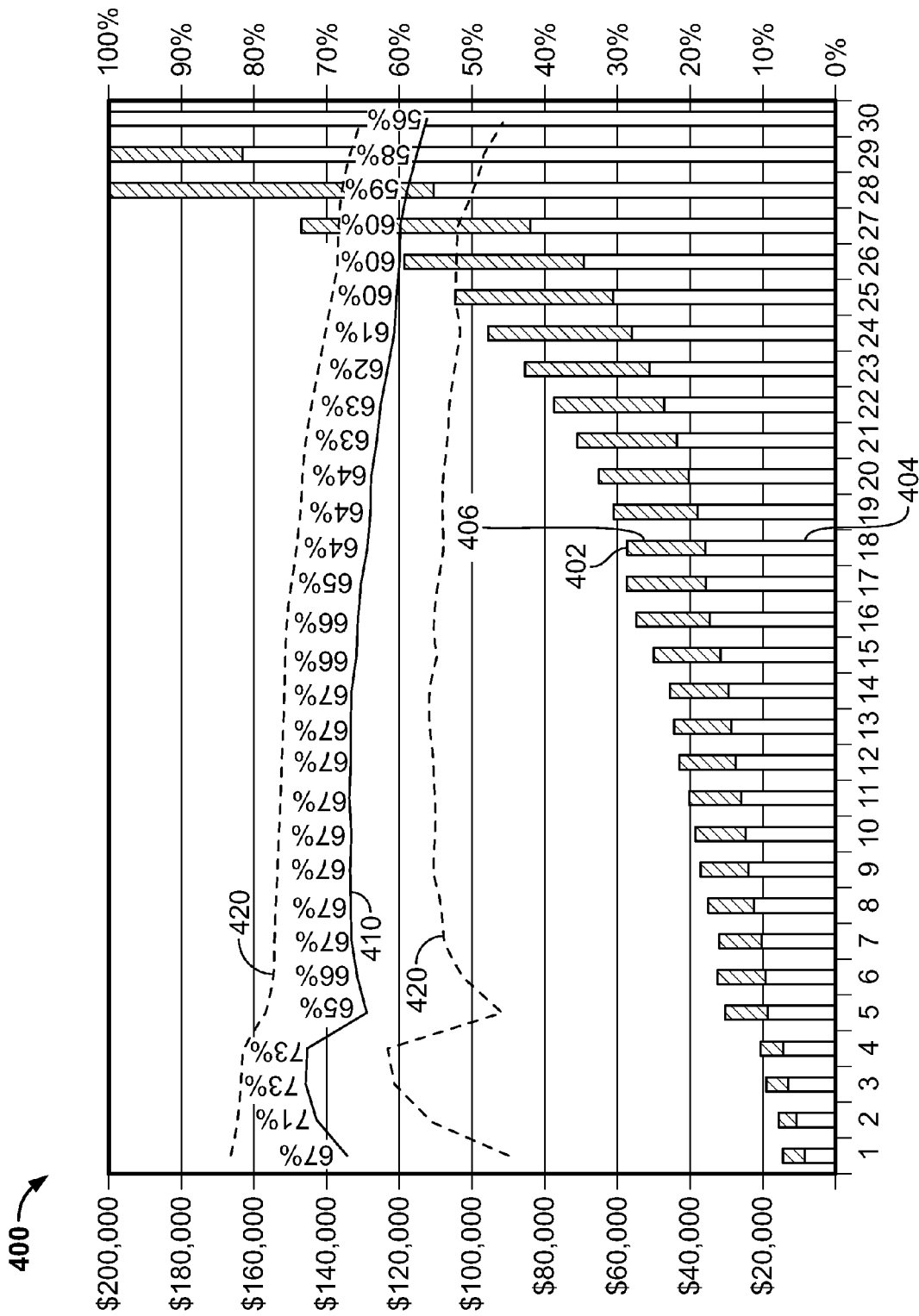
FIG. 4 shows yet other information that may be used in accordance with the principles of the invention.

FIG. 4 shows column chart 400. Chart 400 shows 30 pay-amount bins along a horizontal axis. The bins correspond to total pay-amount ranges that increase from left to right. 89,000 individuals were ranked by total pay amount and then divided into groups having approximately the same number of individuals.

Average total pay for each group is represented by the height of a column in the bin corresponding to the group. Average net pay for each group is represented by the position of a horizontal dividing line in each column. Pay amount is read from the left vertical axis. Net pay as a percentage of total pay for each group is plotted along curve 410. Net pay percentage values are read from the right vertical axis. Confidence intervals $P_{90}$ and $P_{10}$ corresponding to curve 410 are plotted along curves 420.

For example, pay column 402 includes net pay portion 404 and withheld pay portion 406. Withheld pay may include any withholding, such as tax, social security, investment, etc. The total pay is the sum of net pay portion 404 and withheld pay portion 406. Plot 410 shows that net pay portion 404 is 64% of the total pay. After removing outliers, the point estimate for net pay as a percentage of gross pay ranges from 57% to 73%. For 75% of the population that point estimate ranges from 60% to 67%.

FIGS. 5-9 show illustrative features of embodiments of the invention that use applicant banking information to enhance the applicant's credit application experience.

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope and spirit of the present invention.

As will be appreciated by one of skill in the art upon reading the following disclosure, various aspects described herein may be embodied as a method, a data processing system, or a computer program product. Accordingly, those aspects may take the form of an entirely hardware embodiment, an entirely software embodiment or an embodiment combining software and hardware aspects.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 5:
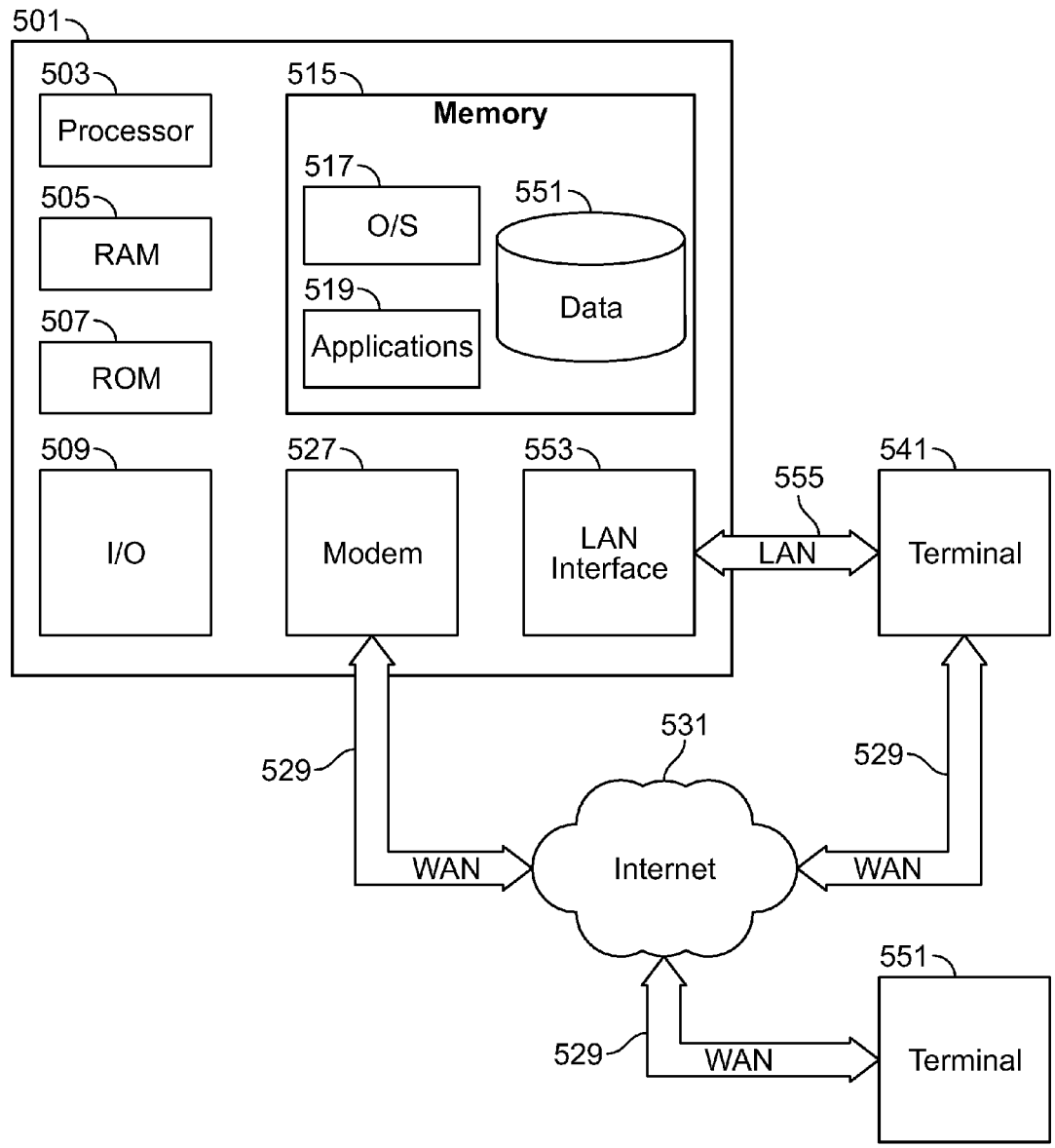
FIG. 5 shows apparatus in accordance with the principles of the invention.

FIG. 5 illustrates a block diagram of a generic computing device 501 (alternatively referred to herein as a "server") that may be used according to an illustrative embodiment of the invention. The computer server 501 may have a processor 503 for controlling overall operation of the server and its associated components, including RAM 505, ROM 507, input/output module 509, and memory 515.

Input/output ("I/O") module 509 may include a microphone, keypad, touch screen, and/or stylus through which a user of device 501 may provide input, and may also include one or more of a speaker for providing audio output and a video display device for providing textual, audiovisual and/or graphical output. Software may be stored within memory 555 and/or storage to provide instructions to processor 503 for enabling server 501 to perform various functions. For example, memory 555 may store software used by server 501, such as an operating system 517, application programs 519, and an associated database 551. Alternatively, some or all of server 501 computer executable instructions may be embodied in hardware or firmware (not shown). As described in detail below, database 551 may provide storage for account information, account holder information, account application data and statistics, and any other suitable information.

Server 501 may operate in a networked environment supporting connections to one or more remote computers, such as terminals 541 and 551. Terminals 541 and 551 may be personal computers or servers that include many or all of the elements described above relative to server 501. The network connections depicted in FIG. 1 include a local area network (LAN) 555 and a wide area network (WAN) 529, but may also include other networks. When used in a LAN networking environment, computer 501 is connected to LAN 555 through a network interface or adapter 553. When used in a WAN networking environment, server 501 may include a modem 527 or other means for establishing communications over WAN 529, such as Internet 531. It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, application program 519, which may be used by server 501, may include computer executable instructions for invoking user functionality related to communication, such as email, short message service (SMS), and voice input and speech recognition applications.

Computing device 501 and/or terminals 541 or 551 may also be mobile terminals including various other components, such as a battery, speaker, and antennas (not shown).

A financial institution may use a terminal such as 541 or 551 to query a database. Customer account information and/or any other suitable information, may be stored in memory 555. The customer account information may be queried and/or processed by an application such as one of applications 519.

One or more of applications 519 may include an algorithm that may be used to estimate income, credit-related expenses, credit risk-related information or any other suitable information. Applications 519 may include functions summarizing and reporting estimated income, credit-related expenses, credit risk-related information or any other suitable information.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, laptop devices, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 6:
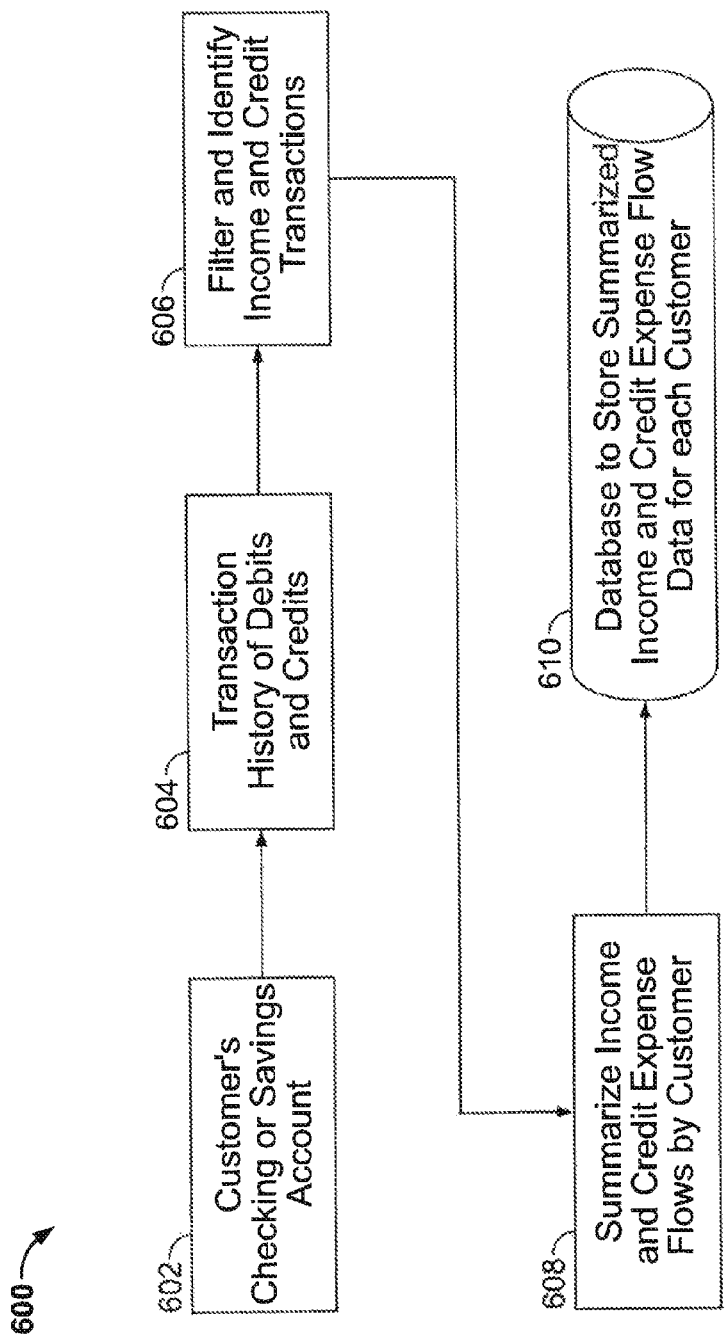
FIG. 6 shows a process in accordance with the principles of the invention.
Figure 7:
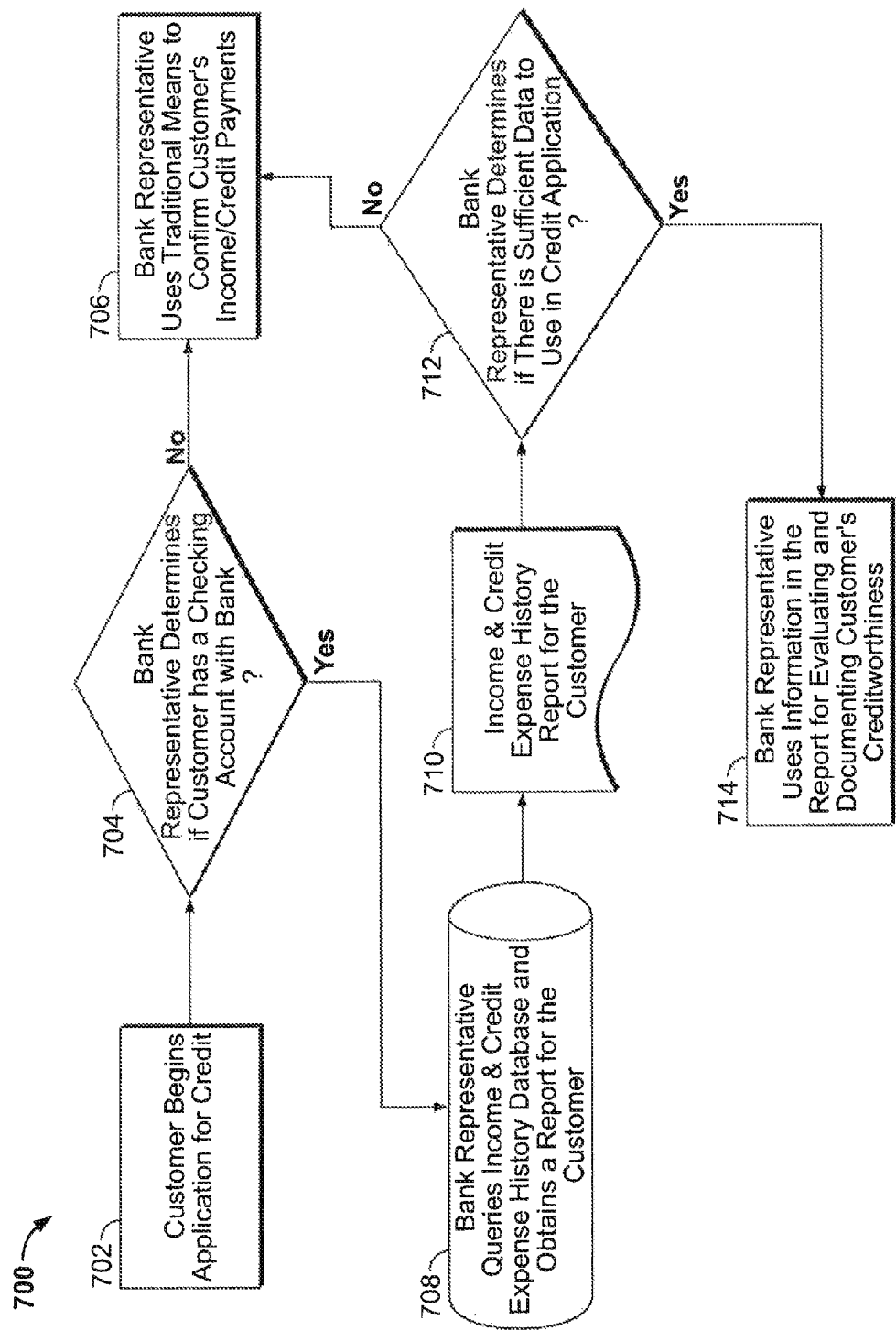
FIG. 7 shows another process in accordance with the principles of the invention.

FIGS. 6-7 show illustrative processes in accordance with the principles of the invention. For the sake of illustration, those process will be described as being performed by a system. The system may include one or more of the devices shown in FIG. 5, one or more individuals and/or any other suitable device or approach.

FIG. 6 shows illustrative income and credit history collection process 600. Process 600 may begin at step 602. At step 602, the account of a credit applicant who is a customer of the financial institution may be accessed. The account may be an account that receives direct deposits that include the applicant's pay. At step 604, the system may acquire a transaction history from the account. The transaction history may include records of debits and credits. The transaction history may include all inflows to, and outflows from, the applicant's account. The inflows and outflows may include ACH transactions, billpay transactions, check transactions, ATM transactions, wire transactions, transfers, fees and any other transactions.

At step 606, the system may filter the transaction records to identify income- and credit-related records. Income-related transactions may include direct deposit paychecks; annuity, interest, and dividend income; social security income; pension income and any other sources of income. Credit-related transactions may include mortgage payments, credit card payments, loan or line of credit payments and any other payments.

At step 608, the system may summarize the income- and credit-related records in a summary. The summary may include monthly transactional information. The summary may include transactional information for a number of months. The system may summarize the records in any suitable way. For example, the system may summarize the records as income and credit expense flow reports. At step 610, the summary may be stored in a database. In some embodiments, customer accounts may be processed by process 600 as a batch. In such methods, the corresponding summaries may be stored in the database so that they will be available for future analysis.

FIG. 7 shows illustrative income and credit expense history lookup process 700. Process 700 may begin at step 702 when an applicant initiates an application for credit. At step 704, a bank representative may determine if the applicant has an account with the bank. If not, process 700 may continue at step 706. At step 706, the bank representative may use traditional means to confirm the applicant's income and credit payments. If the applicant does have an account at the bank, process 700 may continue at step 708. At step 708, the bank representative may use the system to query the income and credit expense history database. Querying the database may involve providing the system with the applicant's account or identification information. The bank representative may query the database via an online application.

At step 710, the representative may obtain a report based on the applicant's account. At step 712, the bank representative may determine whether the report includes sufficient data for processing the credit application. Criteria for sufficiency of the data may be formulated by the bank, the credit lending industry and/or federal regulators. If not sufficient, process 700 may continue at step 706 (see above). If the report is sufficient, process 700 may continue at step 714. At step 714, the bank representative may use the report for evaluating and documenting the applicant's creditworthiness. Step 714 may involve any suitable number of other bank representatives.

It is noted that even if at step 712 it is determined that the report is not sufficient for continuing to step 714, the report may be included in the credit application.

FIGS. 8A and 8B show illustrative income reports 802, 804 and 806, each of which is for a different household. (In FIGS. 8A, 8B, 9A and 9B, an applicant is considered a "household.") Reports 802, 804 and 806 are based on financial institution customer accounts. A financial institution representative may use such reports to evaluate loan applications that are submitted to the financial institution by loan applicants that are also bank customers.

The reports show a household identification number and an income type in column 820. Column 822 includes actual monthly income for each income type. Column 824 shows estimated annual net income for each type. The estimated annual net income may be based on the monthly data shown in column 822. Column 826 shows estimated annual gross income for each income type. Column 828 shows estimated withholding for each income type.

The estimates in columns 826 and 828 may be based on any suitable relationship between customer transactions and customer income. For example, the estimates in columns 826 and 828 for each income type may be based on observed ratios between ACH pay data and actual net pay or gross pay. The observed ratios may be based on the data illustrated in FIG. 4 and described above.

Supplemental data 830, shown adjacent reports 802, 804 and 806, may be included. Supplemental data 830 may include total monthly income as stated on an applicant's credit application, implied annual income amount (annualized value of monthly income stated on the credit application), estimated annual gross income minus implied annual income and any other suitable supplemental information.

FIGS. 9A and 9B show illustrative income reports 808, 810 and 812, each of which is for a different household. The reports shown in FIGS. 9A and 9B have the same format as the reports shown in FIGS. 8A and 8B. Columns 820, 822, 824, 826 and 828 shown in FIGS. 9A and 9B have the same significance as those shown in FIGS. 8A and 8B. Supplemental information 830 shown in FIGS. 9A and 9B has the same significance as supplemental information 830 shown in FIGS. 8A and 8B. Although FIGS. 8A-8B and 9A-9B show more than one report, it will be understood that the apparatus and methods of the invention may present a single or multiple reports in a single view.

FIGS. 10-12 show illustrative income and credit expense reports 1000, 1100 and 1200, respectively. Reports 1000, 1100 and 1200 are based on financial institution customer accounts. A financial institution representative may use such reports to evaluate loan applications that are submitted to the financial institution by loan applicants that are also bank customers.

Illustrative income and credit expense report 1000 may include customer identification and date information 1002. Column 1004 may include flow flags that show whether a cash flow is into ("IN") the account or out of ("OUT") the account. Income and credit payment amounts that correspond to the flags are shown in column 1010.

Column 1006 includes "type of income" information. "Type of income" information may include a source of the income. "Type of income" column 1006 may also include "type of credit payment" information. For example, column 1006 includes "PAY-employment pay," which characterizes the corresponding amounts as employment payment. Column 1006 also includes "CRD-payment to credit card," which characterizes the corresponding amounts as credit card payment amounts.

Column 1008 includes business entity information. Business entity information identifies in further detail the business entity from whom corresponding income amounts were received or to whom corresponding income amounts were paid.

Monthly totals for each column 1008 business entity are shown in column 1010. Payments are shown in parentheses as negative amounts. Column 1012 shows total amounts for each business entity for the months shown in column 1010.

Report 1000 is based on a customer account that has both income and credit expense records. Report 1100 (shown in FIG. 11) is based on a customer account that has only income records. Report 1200 (shown in FIG. 12) is based on a customer account that has only credit expense records. Information 1002 and columns 1004, 1006, 1008, 1010 and 1012 shown in FIGS. 11 and 12 have the same significance as those shown in FIG. 10.

Aspects of the invention have been described in terms of illustrative embodiments thereof. A person having ordinary skill in the art will appreciate that numerous additional embodiments, modifications, and variations may exist that remain within the scope and spirit of the appended claims. For example, one of ordinary skill in the art will appreciate that the steps illustrated in the figures may be performed in other than the recited order and that one or more steps illustrated may be optional. The methods and systems of the above-referenced embodiments may also include other additional elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, systems and methods for processing a loan application have been provided. Persons skilled in the art will appreciate that the present invention can be practiced by other than the described embodiments, which are presented for purposes of illustration rather than of limitation, and that the present invention is limited only by the claims that follow.

What is claimed is:

1. One or more non-transitory computer-readable media storing computer-executable instructions which, when executed by a processor on a computer system, perform a method for generating a lending risk report, the method using an electronic information processing platform, the method comprising:

using the computer-readable media to receive instructions to query a database for transactional information from a customer's bank account;

using the processor to generate a lending risk report based at least in part on the transactional information;

using the processor to electronically transmit the lending risk report to an output device receiver; and optionally initiating an underwriting process that is based on the lending risk report generated, wherein the lending risk report includes at least:

a first number corresponding to a quantity of credit funds withdrawn from the customer's bank account during a predetermined time period; and a second number corresponding to a statistically probable quantity of gross funds earned by the customer during the predetermined time period, the statistically probable quantity of gross funds being calculated by the equation:

$$(\Sigma^{n}_{i=1} D[i]) * (F)$$

wherein:

$D[i]$: corresponds to a value of income-related funds deposited in the customer's bank account during the predetermined time period;

n: corresponds to a number of income-related fund deposits executed during the predetermined time period; and F: corresponds to a factor that modifies the total value of the income-related fund deposits to correspond to a statistically probable quantity of gross funds earned by the customer during the predetermined time period.

2. The non-transitory computer-readable media of claim 1 wherein the querying comprises querying the database for customer income information that is derived from the transactional information.

3. The non-transitory computer-readable media of claim 2 further comprising, in response to the querying, receiving annual income information.

4. The non-transitory computer-readable media of claim 2 further comprising, in response to the querying, receiving regular income information.

5. The non-transitory computer-readable media of claim 2 further comprising, in response to the querying, receiving net income information.

6. The non-transitory computer-readable media of claim 1 wherein the querying comprises querying the database for customer payment information that is derived from the transactional information.

7. The non-transitory computer-readable media of claim 6 further comprising, in response to the querying, receiving annual payment information.

8. The non-transitory computer-readable media of claim 6 further comprising, in response to the querying, receiving regular payment information.

9. One or more non-transitory computer-readable media storing computer-executable instructions which, when executed by a processor on a computer system, perform a method for generating a lending risk report, the method using an electronic information processing platform, the method comprising:

using the computer-readable media to receive instructions to access a customer account, the customer account including a plurality of transactions;

identifying among the transactions those transactions that belong to a credit-related transaction category;

identifying among the transactions those transactions that belong to an income-related transaction category; and using the processor to electronically transmit the lending risk report, wherein the lending risk report includes at least a summary of the transactions included in the credit-related transaction category and the income-related transaction category, wherein:

the credit-related transaction category includes at least a first number corresponding to a quantity of credit-related funds withdrawn from the customer's bank account during a predetermined time period; and the income-related transaction category includes at least a second number corresponding to a statistically probable quantity of gross funds earned by the customer during the predetermined time period, the statistically probable quantity of gross funds being calculated by the equation:

$$(\Sigma^{n}_{i=1} D[i])*(F)$$

wherein:

D[i]: corresponds to a value of income-related funds deposited in the customer's bank account during the predetermined time period;

n: corresponds to a number of income-related fund deposits executed during the predetermined time period; and F: corresponds to a factor that modifies the total value of the income-related fund deposits to correspond to a statistically probable quantity of gross funds earned by the customer during the predetermined time period.

10. The non-transitory computer-readable media of claim 9 further comprising providing the report to a financial institution associate.

11. The non-transitory computer-readable media of claim 9 further comprising initiating an underwriting process that is based, at least in part, on the report.

12. The non-transitory computer-readable media of claim 9 further comprising, when the customer account is in the custody of a first financial institution, providing the report to a representative of a second financial institution.

13. The non-transitory computer-readable media of claim 12 further comprising receiving, on the part of the first financial institution, a fee from the second financial institution, the fee being received in exchange for providing the report.

14. An apparatus for generating a lending risk report, the apparatus comprising:

a database engine;

a processing module in communication with the database engine; and an output device in communication with the processing module;

wherein:

the database engine is configured to provide to the processing module a transaction record from a customer account;

the processing module is configured to categorize the transaction record, the categorization including at least an income-related category and an expense-related category; and the output device is configured to output the lending risk report, wherein the lending risk report includes a number corresponding to a statistically probable quantity of gross funds earned by the customer during a predetermined time period, the statistically probable quantity of gross funds being calculated by the equation:

$$(\Sigma^{n}_{i=1} D[i])*(F)$$

wherein:

D[i]: corresponds to a value of income-related funds deposited in the customer's bank account during the predetermined time period, the deposit of the income-related funds being included in the income-related category;

n: corresponds to a number of income-related fund deposits executed during the predetermined time period; and F: corresponds to a factor that modifies the total value of the income-related fund deposits received during the predetermined time period to correspond to a statistically probable quantity of gross funds earned by the customer during the predetermined time period.

15. The apparatus of claim 14 wherein the output device is configured to output first information identifying a regular-income-related category.

16. The apparatus of claim 14 wherein the output device is configured to output first information identifying a net-income-related category.

17. The apparatus of claim 14 wherein the output device is configured to output first information identifying a payment-related category.

18. The apparatus of claim 14 wherein the output device is configured to output an income flow based on the record.

19. The apparatus of claim 14 wherein the output device is configured to output an expense flow based on the record.

20. The apparatus of claim 14 further comprising a storage module, the output device providing the first information identifying the category and second information based on the record to the storage module.

21. The apparatus of claim 20 wherein the first information identifying the category and second information based on the record are included in an income and expenses flow report that is stored in the storage module.

* * * * *